United States Patent

Yanagida

[11] 4,208,622
[45] Jun. 17, 1980

[54] MOTOR CIRCUIT OF A TAPE RECORDER

[75] Inventor: Tuneo Yanagida, Hachioji, Japan

[73] Assignee: Olympus Optical Co., Ltd., Tokyo, Japan

[21] Appl. No.: 897,422

[22] Filed: Apr. 18, 1978

[30] Foreign Application Priority Data

Apr. 20, 1977 [JP] Japan .................. 52-49678[U]

[51] Int. Cl.$^2$ .................................. H02P 7/08
[52] U.S. Cl. ............................. 318/257; 242/201; 242/67.4; 318/6; 318/293; 318/417; 318/305
[58] Field of Search ........... 318/257, 6, 7, 293, 318/417, 305, 259; 242/201, 67.4

[56] References Cited

U.S. PATENT DOCUMENTS

| | | | |
|---|---|---|---|
| 3,773,277 | 11/1973 | Nagahiro et al. ............ | 242/201 |
| 3,851,235 | 11/1974 | Harrison, Jr. ............... | 318/257 |
| 3,863,117 | 1/1975 | Paschetto .................... | 318/7 |

*Primary Examiner*—David Smith, Jr.

[57] ABSTRACT

A motor circuit of a tape recorder comprises a mechanical switch in which a movable contact is connected to a first contact in response to the depression of a recording or reproduction button, and also to a second contact in response to the depression of a fast feeding or rewinding button. A motor control circuit is connected to a D.C. power source through the first contact of the mechanical switch to provide a motor speed suitable for the recording or reproduction. An output terminal of a constant voltage circuit connected to the D.C. power source is connected to the motor through a switching transistor. The switching transistor is rendered conducting in response to the closing of the second contact of the mechanical switch, causing an output from the constant voltage circuit to be supplied to the motor to rotate the motor at a high speed suitable for the fast feeding or rewinding.

3 Claims, 2 Drawing Figures

F I G. 1
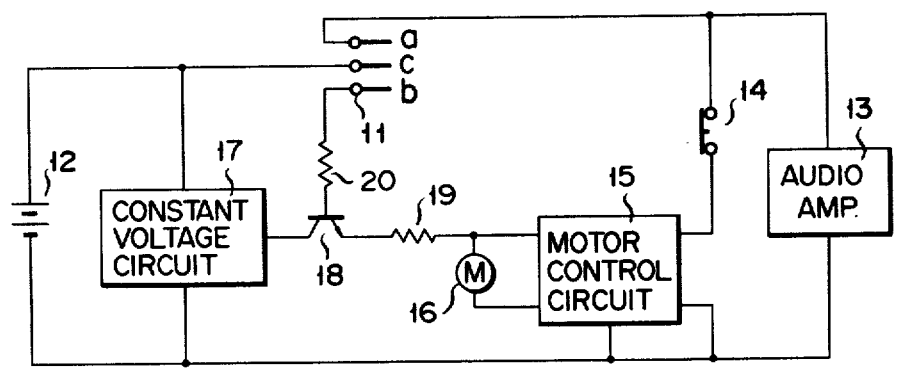
F I G. 2
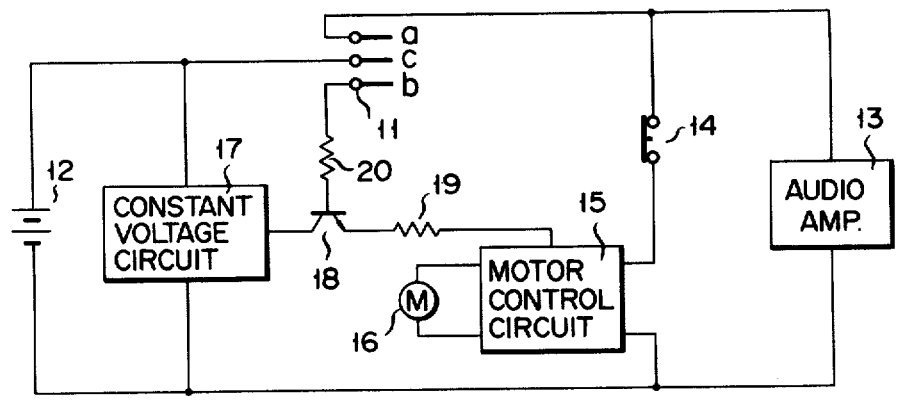

MOTOR CIRCUIT OF A TAPE RECORDER

BACKGROUND OF THE INVENTION

This invention relates to a circuit of a tape recorder, and more particularly to a motor circuit using a D.C. motor.

With a tape recorder, it is generally necessary to take up a magnetic tape at a higher speed for fast feeding and rewinding than for recording and reproduction. Hitherto, the running speed of the magnetic tape has been changed by mechanical means, that is, by selectively using an idler or belt. This mechanical speed-changing system has the drawback that where a tape recorder motor is directly connected to, for example, a battery, the running speed of a magnetic tape more noticeably changes with respect to recording, reproduction, fast feeding and rewinding, according as the energy of the battery is more consumed. To eliminate this drawback, the recently developed tape recorder is provided with a motor control circuit for controlling the drive of a motor. Thus, the motor is connected to the control circuit for recording and reproduction and to a battery for fast feeding and rewinding of a magnetic tape. This system can indeed stabilize the running speed of the magnetic tape for recording and reproduction, but still has the drawback that the rotating velocity of the motor drops in case of fast feeding and rewinding, according as the energy of the battery is more depleted, thereby retarding the takup of the magnetic tape.

SUMMARY OF THE INVENTION

It is accordingly the object of this invention to provide a tape recorder motor circuit which can stabilize the running speed of a magnetic tape for recording and reproduction and ensure the fast feeding and rewinding of the magnetic tape, no matter how the voltage of a power source varies.

According to this invention, there is provided a tape recorder motor circuit which comprises a motor control circuit for controlling the driving speed of the motor in case of recording and reproduction; and a constant voltage circuit for energizing the motor in case of fast feeding and rewinding.

BRIEF DESCRIPTION OF THE DRAWING

FIG. 1 is a block diagram of a tape recorder motor circuit according to one embodiment of this invention; and FIG. 2 is a block diagram of a tape recorder motor circuit according to another embodiment of the invention.

DETAILED DESCRIPTION OF THE INVENTION

Referring to FIG. 1, a changeover switch 11 is operated in response to the depression of a recording or reproduction button (not shown) of a tape recorder and also in response to the depression of a fast feeding or rewinding button (not shown) of the tape recorder. A contact c of the changeover switch 11 is connected to, for example, the positive pole of a D.C. power source or battery 12. A contact a of the changeover switch 11 is connected to an audio amplifier 13 and a motor control circuit 15 through a pause switch 14 of a tape recorder. The output terminal of the motor control circuit 15 is connected to a D.C. motor 16 for driving a rotation mechanism (not shown) of the tape recorder. The motor control circuit 15 is formed of, for example, a servo amplifier, which is designed to drive the tape recorder motor at such speed as corresponds to that at which a magnetic tape travels for recording and reproduction.

A constant voltage circuit 17 is connected in parallel to the battery 12. An output terminal of the constant voltage circuit 17 is connected to the D.C. motor 16 through a collector-emitter pass of a switching transistor 18 and resistor 19. A base of the switching transistor 18 is connected to the contact b of the changeover switch 11 through a resistor 20.

There will now be described the tape recorder motor circuit arranged as described above. The contact c is connected to the contact a in response to the depression of a recording or reproduction button and also to the contact b in response to the depression of a fast feeding or rewinding button. Where the recording or reproduction button is depressed, the voltage of the battery 12 is impressed on the audio amplifier 13 through the contacts c and a. The voltage of the battery 12 passing through the contacts c and a is supplied to the motor control circuit 15 through the pause switch 14. The voltage of the battery 12 is converted by the motor control circuit 15 into a stabilized level capable of causing the D.C. motor 16 to be driven at a speed corresponding to the running speed of a magnetic tape adapted for recording or reproduction. The converted stabilized voltage is impressed on the motor 16, which in turn is driven at a speed suitable for recording or reproduction.

Where the fast feeding or rewinding button is depressed, then the contact c of the changeover switch 11 is connected to the contact b, causing the motor control circuit 15 and audio amplifier 13 to be disconnected from the battery 12. Instead, the positive voltage of the battery 12 is supplied to the base of the switching transistor 18 through the contacts c, b and resistor 20. As the result, the switching transistor 18 is rendered conducting. At this time, an output voltage from the constant voltage circuit 17 is impressed on the D.C. motor 16 through the collector-emitter pass of the switching transistor 18 and the resistor 19. In case of fast feeding and rewinding, therefore, the motor 16 is driven at a constant speed by a stabilized output voltage from the constant voltage circuit 17, independently of depletion of the energy of the battery 12. Accordingly, the magnetic tape is taken up quickly under a stable condition.

As mentioned above, this invention enables a magnetic tape to travel for recording, reproduction, fast feeding and rewinding without a delay resulting from the drop of a power source voltage or depletion of the energy of the battery 12.

With the foregoing embodiment, the emitter of the switching transistor 18 is connected to the D.C. motor 16 through the resistor 19. However, the emitter may be connected, as shown in FIG. 2, to a bias circuit of the motor control circuit 15. In this case, an output constant voltage from the constant voltage circuit 10 which has passed through the collector-emitter pass of the switching transistor 18 and resistor 19 changes the bias voltage of the motor control circuit 15, thereby increasing an output voltage therefrom and effecting the fast rotation of the D.C. motor 16.

With the motor circuit according to the second embodiment of FIG. 2, the switching transistor 18 and constant voltage circuit 10 can well serve the purpose with a small capacity, greatly contributing to the miniaturization of a tape recorder.

The tape recorder motor circuit of this invention comprises an npn transistor. However, it is possible to use a pnp transistor. In this case, however, the changeover switch 11 should be positioned on the negative side of the battery 12.

What is claimed is:

1. A tape recorder motor circuit designed selectively to carry out at least the recording, reproduction, fast feeding and rewinding of a magnetic tape which comprises a D.C. power source circuit; a switching circuit provided with at least first and second output means and connected to the power source circuit; a motor control circuit connected to the first output means of the switching circuit; a D.C. motor connected to the output terminal of the motor control circuit; a switching transistor circuit whose control input terminal is connected to the second output means of the switching circuit; and a constant voltage circuit connected to the D.C. power source circuit to stabilize an output voltage therefrom, and wherein the first output means of the switching circuit supplies the motor control circuit with an output voltage from the D.C. power source in response to the recording or reproduction mode of the tape recorder; and the second output means of the switching circuit renders the switching transistor circuit conducting in response to the fast feeding or rewinding mode of the tape recorder, thereby controlling the motor circuit by an output voltage from the constant voltage circuit which has passed through the switching transistor circuit, said switching circuit being formed of a changeover switch interlocking with operation buttons for effecting the recording, reproduction, fast feeding and rewinding of the tape recorder; said changeover switch comprising a first contact connected to the D.C. power source circuit, a second contact connected to the motor control circuit to act as said first output means and a third contact connected to the control input terminal of the switching transistor circuit to act as said second output means.

2. A tape recorder motor circuit according to claim 1, wherein the output terminal of the switching transistor circuit is connected to the bias circuit of the motor control circuit; and, when the switching transistor circuit is rendered conducting by an output from the second output means of the changeover switch circuit, the motor control circuit is controlled by an output constant voltage from the constant voltage circuit which is supplied through the switching transistor circuit.

3. A tape recorder motor circuit according to claim 1, wherein the switching transistor circuit comprises a transistor whose base is connected to the second output means of the changeover switch circuit and whose collector-emitter pass is connected between the output terminal of the constant voltage circuit and the motor.

* * * * *